Figure 1:
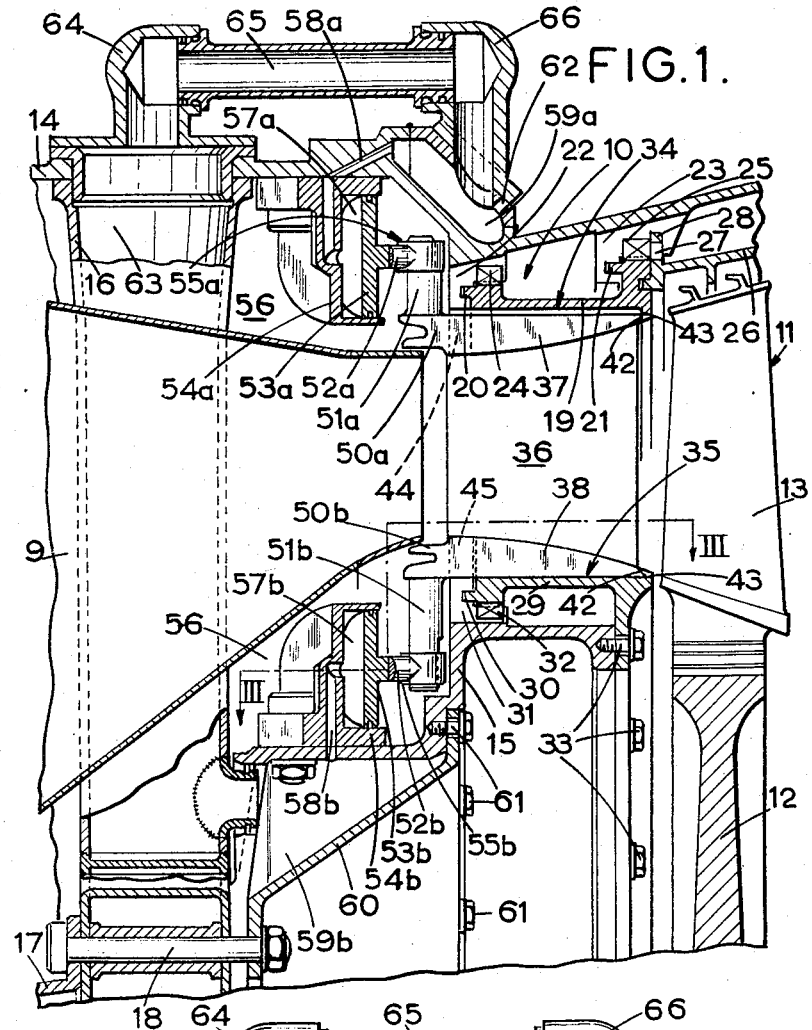

Dec. 2, 1958  L. HAWORTH ET AL  2,862,357
TURBINES
Filed Aug. 1, 1956  3 Sheets-Sheet 1

Inventors
Lionel Haworth
Roy Martin Heathcote
by
Leech and Radue
Attorneys

Dec. 2, 1958 L. HAWORTH ET AL 2,862,357
TURBINES
Filed Aug. 1, 1956 3 Sheets-Sheet 2

Inventors
Lionel Haworth
Roy Martin Heathcote
by
Leech and Radue
Attorneys

Dec. 2, 1958   L. HAWORTH ET AL   2,862,357
TURBINES
Filed Aug. 1, 1956   3 Sheets-Sheet 3

Inventors
Lionel Haworth
Roy Martin Heathcote
by Leech and Radue
Attorneys

United States Patent Office 2,862,357
Patented Dec. 2, 1958

2,862,357

TURBINES

Lionel Haworth, Littleover, and Roy Martin Heathcote, Belper, England, assignors to Rolls-Royce Limited, Derby, England Application August 1, 1956, Serial No. 601,555

Claims priority, application Great Britain August 16, 1955

14 Claims. (Cl. 60—39.25)

This invention relates to turbines and has for an object to provide an improved construction of turbine nozzle guide vanes of which the throat area is variable.

According to this invention the inner and outer shrouds of each nozzle guide vane of the turbine each have a radially inner part and a radially outer part, of which the part further from the vane portion is located with respect to adjacent structure, and of which the part adjacent the vane portion of the nozzle guide vane is accommodated in a recess in the other part and is shaped to have an apex adjacent the trailing edge of the vane which abuts against and is pivotable about a substantially radial axis on a corresponding part of the wall of the recess.

The apex of the pivotable shroud part may be curved and in the preferred embodiment is part of a circle of small radius, and the corresponding portion of the wall of the recess in the other shroud part is also of part-circular form. The pivot is thus of the type commonly known as a "knife edge."

A shallow concavity may be formed on one or on each face of the moveable shroud part adjacent to the pivot apex, so that the part-cylindrical apex portion may be formed of smaller radius.

According to a feature of the invention it may be arranged that in one position of adjustment of the pivotable shroud parts each of the latter has a face on the concave side of the vane in sealing engagement with the adjacent wall of the recess in the fixed shroud part, and in another position of adjustment each pivotable shroud part has a face on the convex side of the vane in sealing engagement with its adjacent wall of the recess in the fixed shroud part. In this way leakage of gas from upstream to downstream of the nozzle guide vanes without passing through the throats between adjacent vanes is reduced.

According to another feature of the invention there is provided operating mechanism for varying the throat area of the nozzle guide vanes, comprising a number of cylinders, at least one for each vane, secured to fixed structure of the turbine and each containing a piston connected to the pivotable shroud part adjacent its upstream end and arranged so that movement of the piston in the cylinder causes movement of the pivotable shroud part between its limiting positions.

In one arrangement in accordance with this feature of the invention each of the cylinders has one end open and the cylinder space between the piston and the other end of the cylinder is connected alternatively to a pressure source and to a point at low pressure, and the cylinder is located in a space which is at the pressure of the gases entering the turbine. Thus when the cylinder space is vented to the point at low pressure the piston is subjected to the pressure of the gases entering the turbine in the sense to move the shroud part to one of its limiting positions.

The pressure source may be formed by a space at the pressure of the gases entering the turbine, and in this case it is arranged that the gas load on the nozzle guide vanes, due to the gas flow between them, loads the shroud parts towards one limiting position, in which position the cylinder space is connected to the pressure source and the pressures acting on the two sides of the piston are substantially equal, and it is also arranged that the pressure load on the piston when the cylinder space is connected to a point at low pressure overcomes the gas load and holds the shroud parts in the other limiting position.

It will be appreciated that, while the pressure source may conveniently be at the pressure of the gases entering the turbine, it is undesirable for the piston and cylinder to be at the temperature of the gases entering the turbine, and in accordance with yet another feature of the invention, as applied to a gas turbine engine, the pressure source may be constituted by the space between the flame tube and the air casing of the combustion equipment of the engine, which contains air at the delivery pressure of the compressor of the engine but at a substantially lower temperature than the gases within the flame tube which are led to the entry of the turbine.

Figure 2:
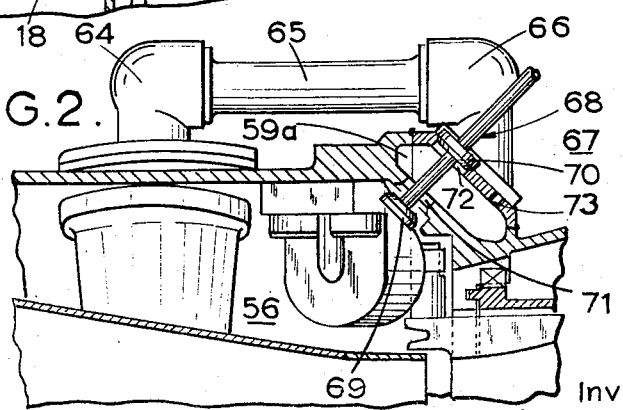
Figure 3:
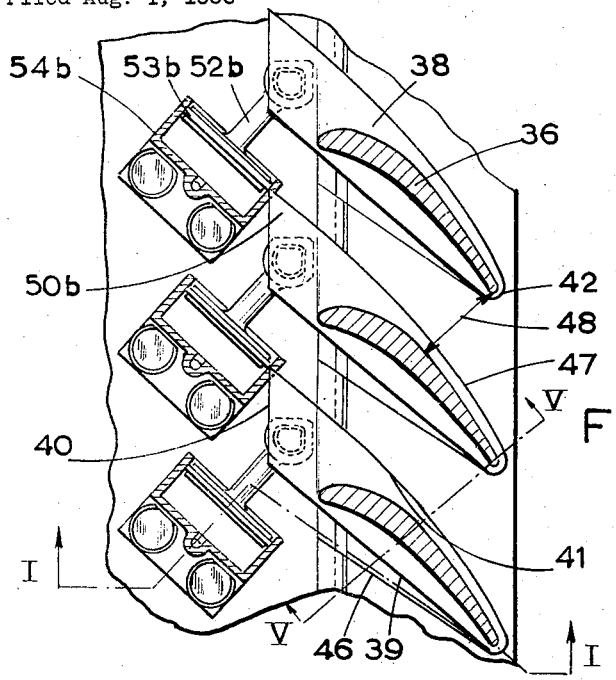
Figure 4:
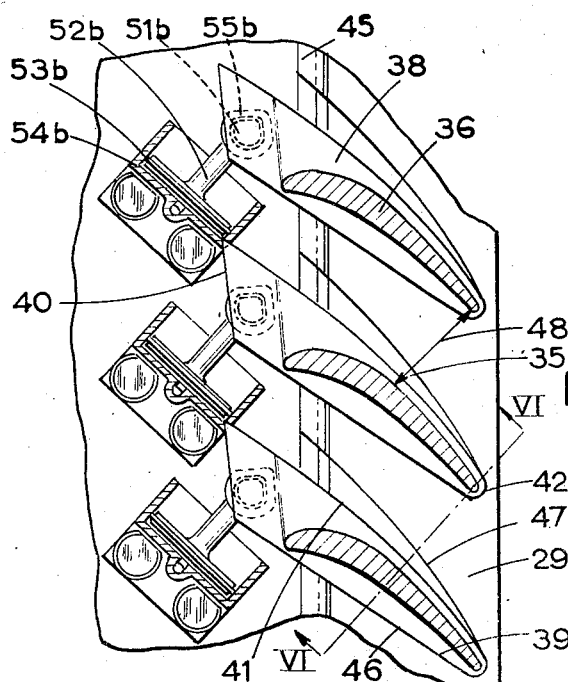
Figure 5:
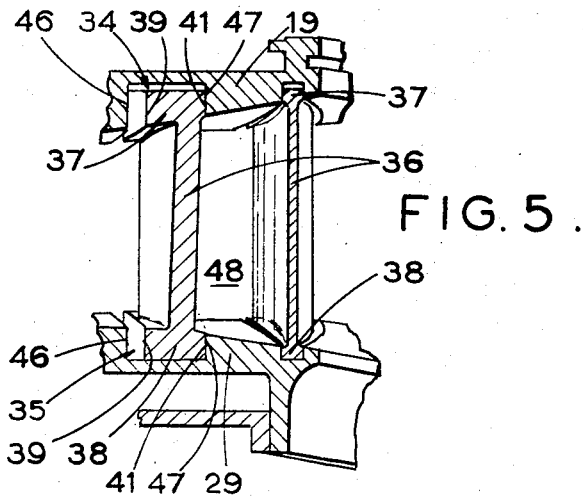
Figure 6:
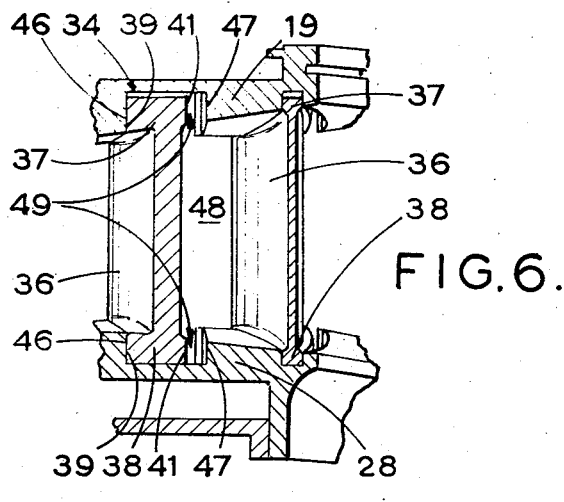
Figure 7:
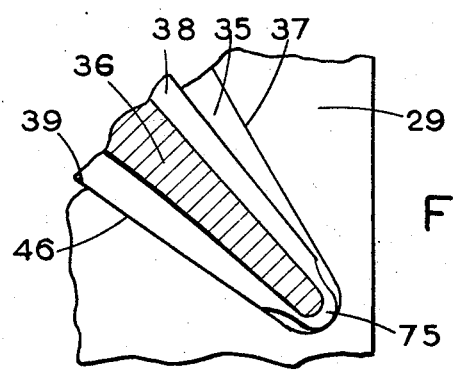

One embodiment of this invention as applied to a gas turbine engine will now be described with reference to the accompanying drawings of which:

Figure 1 shows a turbine in accordance with the invention in axial section,

Figure 2 is a section similar to part of Figure 1 taken in a different radial plane, Figure 3 is a section on the line III—III of Figure 1, and shows on the line I—I the section on which Figure 1 is taken, Figure 4 is a view corresponding to Figure 3 showing the parts in a different position, Figure 5 is a view on the line V—V of Figure 3, Figure 6 is a view corresponding to Figure 5 on the line VI—VI of Figure 4, and Figure 7 is a view similar to Figure 4 showing a modification.

The turbine comprises a row of nozzle guide vanes generally indicated at 10 which receive working fluid through a duct 9 which forms the outlet end of a flame tube of the combustion equipment of a gas-turbine engine. The combustion equipment is fed with compressed air by a compressor (not shown) driven by the turbine.

The turbine also comprises a turbine rotor 11 having a disc 12 at the periphery of which is mounted a row of blades 13.

The nozzle-guide vanes 10 and the turbine rotor 11 are surrounded by stationary wall structure 14 which also forms the outer pressure-containing air casing wall of the combustion equipment. The stationary structure of the turbine also includes an inner pressure-containing wall 15 which is rigidly connected to the outer wall 14 by means of radially-extending struts 16, and is also connected to the inner pressure-containing air casing wall 17 of the combustion equipment; the walls 15, 17 and the struts 16 are secured together by bolts 18.

The nozzle-guide vane assembly comprises a fixed outer shroud part 19 which may be in the form of a complete ring or which may be made as a number of segments, say four segments. This fixed outer shroud part 19 is located with respect to the outer wall 14 by means of a pair of axially-directed flanges 20, 21 which engage with corresponding grooves in inwardly-directed flanges 22, 23 formed on the wall 14; the flanges 22, 23 are also cut away to provide axial slots within which are engaged dogs 24, 25 which extend from the outer surface of the outer shroud part 19. The latter is also located against axial movement by abutting an annular shroud ring 26 which has lugs 27 which engage bayonet fashion in slots 28 in the flange 23. The outer shroud part 19 may be mounted as more fully described in the copending United States application of Petrie and Everett Serial No. 548,223, filed November 21, 1955.

The nozzle guide vane assembly also comprises a fixed inner shroud part 29 which is located with respect to the wall 15 by means of a forwardly-directed flange 30 engaging in a corresponding groove in a radially-outwardly-directed flange 31 on the wall 15. The fixed inner shroud part 29 is also provided with dogs 32 which engage in radial slots in the flange 31, and is also secured to the wall 15 by setscrews 33.

Each of the outer and inner fixed shroud parts 19, 29 is formed on its side adjacent the working fluid passage with recesses, those 34 on the outer shroud parts 19 being aligned with those 35 on the inner shroud parts 29 and being of the same shape viewed axially of the blade.

Each guide vane 10 has a vane portion portion 36, an outer pivotable shroud portion 37 and an inner pivotable shroud portion 38, the pivotable shroud portions being formed integral with the vane portion. The outer pivotable shroud portion 37 is accommodated within the recess 34 in the outer fixed shroud part 19 and the inner pivotable shroud part 38 is accommodated within the recess 35 in the inner fixed shroud part 29. A small radial clearance is shown between the shroud parts 37, 38 integral with the vane portion 36, and the fixed shroud parts 19, 29, to allow for radial expansion.

Each of the pivotable shroud parts 37, 38 has a shape viewed axially of the vane which may be described as approximately triangular (see Figures 3 and 4). Each shroud part 37, 38 has one long straight side 39 adjacent the concave face of the integral vane portion 36, a short straight side 40 at its upstream end making an obtuse angle with the long straight side, and a curved side 41 which makes an acute angle with the short straight side and is joined to the long straight side by a part-circular portion, the radius of which is small relative to the length of the sides, and which forms the apex 42 of the shroud part 37, 38.

The recesses, 34, 35 in the outer and inner fixed shroud rings 19, 29 are of similar shape to the pivotable shroud parts 37, 38 when viewed axially of the vane, but are shorter measured axially and have a greater apical angle between their long straight side and their curved side. Portions of the flanges 22, 31 form upstream continuations of the fixed shroud parts 19, 29 between the recesses 34, 35, as shown at 44, 45 respectively.

It is arranged that the vanes including the vane portion 36 and the integral pivotable shroud parts 37, 38 may be pivoted by rocking of the part-circular apices 42 of the shroud parts in the corresponding parts of the recesses 34, 35.

The apex 43 of each of the recesses 34, 35, is shown as of part-circular form and is made of larger radius than the apices 42 of the corresponding shroud parts, so that the latter form what is known as a "knife edge" pivot about which the shroud parts 37, 38 move with respect to the fixed parts 19, 29.

The vanes rock between a position in which the faces afforded by the straight sides 39 of the pivotable shroud parts 37, 38 are in contact with the straight faces 46 of the recesses and a position in which the faces afforded by the curved sides 41 of the pivotable shroud parts are in contact with the curved faces 47 of the recesses. In these two limiting positions the contacting faces 41, 47 (Figure 3) and 39, 46 (Figure 4) form seals preventing the escape of gas from between one pair of vanes through the radial clearance between the pivotable parts 37, 38 and the fixed parts 19, 29 of the shrouds, to between the adjacent vanes.

It is particularly important to prevent leakage from between one pair of vanes upstream of the throat 48 to between adjacent vanes downstream of the throat.

It will be appreciated that movement of the vanes from the position in which the straight faces 39, 46 of the pivotable and fixed shroud parts are in contact to the position in which the curved faces 41, 47 are in contact causes a reduction of the width of the throats 48 between adjacent vanes, and thus causes a reduction of throat area.

In the minimum area position (shown in Figure 5) the nozzle throat will have the form of a rhombus, but in the maximum area position (Figure 6) the throat area has an extension 49 at inner and outer radius between the sides 47 and the bases of the recesses 34, 35 and the sides 41 of the shroud parts 37, 38. The small loss of efficiency due to the shape of the throat in the maximum area position may be tolerated in aircraft gas turbine engines, since the maximum area position corresponds to the maximum power rating, which is used for only a small proportion of the running life of the engine, and the minimum area position corresponds to the cruising rating at which the highest efficiency is desirable.

The pivotable shroud parts 37, 38 are formed at their upstream edges with axially-directed extensions 50a, 50b which lie outside the inner and outer walls of the duct 9 to assist in directing the flow of gas through the nozzle guide vanes.

The operating mechanism for pivoting the vanes between the two positions described comprises a radial pin 51a, 51b on each of the pivotable shroud parts 37, 38 extending away from the working fluid passage and engaging the rods 52a, 52b of pistons 53a, 53b which are slidable in corresponding cylinders 54a, 54b secured to the outer and inner walls 14, 15. There is one piston 53a associated with the outer shroud part 37 and one piston 53b associated with the inner shroud part 38 of each vane.

The rods 52a, 52b are arranged to be at right angles to lines joining the pins 51a, 51b and the pivotal axes of the respective shroud parts 37, 38 in the mid position of the latter.

It will be appreciated that the load of the working fluid flowing through the guide vanes causes a gas load on the vanes which tends to move them into the position in which the throat area is a minimum, and thus the pins 51a, 51b on the pivotable shroud parts 37, 38 are held in contact with the faces of the slots 55a, 55b in the piston rods 52a, 52b. The slots are formed with a clearance transversely of the piston rods 52a, 52b to allow for the arcuate movement of the shroud parts.

The cylinder 54a, 54b are located in the space 56 between the ducts 9 and the pressure-containing walls 14, 15 and are open-ended, and thus the fact of the piston 53a, 53b towards the open end of the cylinder 54a, 54b is subjected to the pressure of the compressed air in that space 56. The cylinder space 57a, 57b between the closed end of the cylinder 54a, 54b and the piston 53a, 53b is connected by means of drillings 58a, 58b to a pressure air manifold 59a, 59b.

The pressure air manifold 59b associated with the inner ring of cylinders 54b is formed by means of a conical member 60 secured to the inner wall 15 by means of bolts 18 and set-screws 61 and the manifold 59a associated with the outer ring of cylinders 54a is formed by a conical member 62 welded to the casing 14. The inner manifold 59b is placed in communication with outer manifold 59a by means of passages 63, formed within one or more of the struts 16, each of which communicates at its outer end through a boss 64 secured on the outer wall 14, a tube 65 and a second boss 66 secured on the conical member 62, with the interior of the outer manifold 59a.

Valve means (see Figure 2) is provided to place the manifolds 59a, 59b in communication alternatively with the source of pressure air formed by the space 56 containing air compressed by the compressor and an external space 67 which is vented to atmosphere, and the valve means comprises a double-acting valve 68 having parts 69, 70 which co-operate with a pair of seatings around ports 71, 72 formed one in each of the walls of the outer manifold 59a.

As already mentioned, the nozzle guide vanes are subjected to a load which tends to urge them to the position shown in Figure 3 in which the curved faces 41, 47 of the pivotable and fixed shroud parts are in contact, and thus when the valve member 68 is moved to the position shown in Figure 2 in which the port 71 leading from the manifold to the pressure space 56 is open and the port 72 leading to the external space 67 is closed, then the pressures acting on each side of the pistons 53a, 53b are balanced and the gas load acting on the vanes causes them to adopt the position shown in Figure 3.

A small bleed hole 73 is provided in the outer wall of the outer manifold 59a which permits a small leak from within the manifold to the space 67 outside the manifold, and this bleed results in a slight reduction in the pressure within the manifold and within the spaces 57a, 57b between the closed ends of the cylinders 54a, 54b and the pistons 53a, 53b. It is arranged that this reduction of pressure is enough to hold the piston rods 52a, 52b firmly against the pins 51a, 51b on the shroud parts 37, 38, but is small enough for the gas load acting on the vanes to hold the curved faces 41, 47 of the shroud parts in sealing contact.

Movement of the valve member 68 to the position in which the port 71 leading from the manifold 59a to the pressure space 56 is closed and the port 72 leading to the external space 67 is open causes the cylinder spaces 57a, 57b between the closed ends of the cylinuders 54a, 54b and the pistons 53a, 53b to be vented substantially to atmospheric pressure, and it is arranged that the pressure load acting on the sides of the pistons 53a, 53b facing the open ends of the cylinders is then such as to overcome the gas loads acting on the vanes and to hold the straight faces 39, 46 of the shroud parts in sealing contact in the position shown in Figure 4.

It will be appreciated that the use of one piston and cylinder to each end of each vane ensures that should one of the pistons jam in its cylinder the remaining vanes will be unaffected. The number of nozzle guide vanes is such that the total throat area of the nozzle guide vanes (which is equal to the sum of the individual throat areas) may be adjusted between values close to the desired values even if one vane is jammed. Also the torque imposed on the vane portions 36 of the nozzle guide vanes, which are at a high temperature, is reduced as compared with that which would be required if operating mechanism were provided at one end only of each vane.

In the modification shown in Figure 7, the apex of each of the pivotable shroud parts 37, 38 may be formed by machining away a shallow concavity on each of the faces 39, 41 so as to form a part-cylindrical portion 75 of smaller radius than in the embodiment above described. The portion 75 co-operates with the part-cylindrical apex portion 43 of the corresponding recess. In this way an improved "knife edge" pivot effect may be obtained.

We claim:

1. In a gaseous fluid turbine, in combination, turbine housing and wall structure, a plurality of curved nozzle guide vanes for the working fluid radially arranged in an annulus and adjustable to vary the throat areas between vanes, the vanes having shroud means at their inner and outer ends and each shroud means having radially spaced inner and outer parts, of which the parts farther from the vane positions are stationary and fixedly located with respect to adjacent turbine housing and wall structure, and of which the parts adjacent the vane portion of each nozzle guide vane are secured thereto and accommodated respectively in recesses in the stationary parts and are each shaped to have an apex adjacent the trailing edge of the vane which abuts against and is pivotable about a substantially radial axis on a corresponding part of the wall of the recess, the shroud part secured to each end of each vane being shaped in respect to the recess in which it is received to provide for limited rotational movement therein about said axis.

2. A turbine as claimed in claim 1 in which the apex of the pivotable shroud part is curved and is part of a circle of small radius and the corresponding portion of the wall of the recess in the other shroud part is also of part-circular form thus providing a knife edge pivot.

3. A turbine as claimed in claim 2 in which a shallow concavity is formed on each face of the moveable shroud part adjacent to the pivot apex.

4. A turbine as claimed in claim 1 the shroud means being so shaped and arranged that in one position of adjustment of the pivotable shroud parts each of the latter has a face on the concave side of the vane in sealing engagement with the adjacent wall of the recess in the fixed shroud part, and in another position of adjustment each pivotable shroud part has a face on the convex side of the vane in sealing engagement with its adjacent wall of the recess in the fixed shroud part.

5. A turbine as claimed in claim 4 in which such last-mentioned sealing position provides the smallest area of throat.

6. A turbine as claimed in claim 4 in which there is provided operating mechanism for varying the throat area of the nozzle guide vanes, comprising at least one cylinder for each vane, secured to fixed turbine housing and wall structure and each containing a piston, means connecting the piston to a pivotable shroud part adjacent its upstream end and arranged so that movement of the piston in the cylinder causes movement of the pivotable shroud part between its limiting positions.

7. A turbine as claimed in claim 6, of which the working fluid for the pistons is gas, and in which each of the cylinders has one end open, means to connect the cylinder space between the piston and the other end of the cylinder alternatively to a pressure source and to a point at low pressure, each said cylinder being located in a space which is at the pressure of the gases entering the turbine so that when the cylinder space is vented to the point at low pressure the exposed piston surface is subjected to the pressure of the gases entering the turbine in the sense to move the shroud part to one of its limiting positions.

8. A turbine as claimed in claim 7 in which the pressure source is formed by a space at the pressure of the gases entering the turbine, the nozzle guide vanes being so arranged that the gas load upon them due to the gas flow between them biases the shroud parts towards one limiting position, and in which to move the shroud parts to said one position the cylinder space is connected to the pressure source whereby the pressures acting on the two sides of the piston are substantially equal, and in which it is also arranged that the pressure load on the piston when the cylinder space is connected to said point at low pressure is adequate to overcome the gas load on the vanes and holds the shroud parts in the other limiting position.

9. A turbine as claimed in claim 7 including an air casing and flame tubes therein and in which the pressure source is formed by the space between a flame tube and the air casing of the combustion equipment of the engine, which space contains air at the delivery pressure of compressor of the engine but at a substantially lower temperature than the gases within the flame tube which are led to the entry of the turbine.

10. A turbine as claimed in claim 8 in which said cylinder spaces are connected to a manifold and there is provided valve means which is adapted alternatively to connect said manifold with the pressure source space and with said low pressure point.

11. A turbine as claimed in claim 10 in which there are two cylinders for each vane, means connecting the piston of one to the inner and that of the other to the outer moveable shroud part, and two annular manifolds, one communicating with the cylinder spaces of the cylinders associated with the inner shroud parts and the other with the spaces of the cylinders associated with the outer shroud parts, means connecting said two manifolds into communication with each other, and valve means for connecting said manifolds alternatively to the pressure source or to atmosphere.

12. A turbine as claimed in claim 11 in which the communication between the manifolds is through at least hollow strut member which passes across the working fluid passage upstream of the turbine.

13. A turbine as claimed in claim 10, in which each piston is connected by a piston rod to a radial pin on the moveable shroud part and in which a leak to atmosphere is provided from said manifold so that the pressure on the faces of the pistons inside the cylinder spaces is less than that on the other faces even when the valve means connect the insides of the cylinder spaces with the same pressure source as operates on the other faces of the pistons, the reduced pressure being insufficient to cause the blades to move against the load of the gases upon them but being sufficient to cause the piston rods to place a load on the pins by which the shrouds are moved, in the direction to move the blades against the gas load acting on them due to the flow of gas, thereby to take up any backlash.

14. A turbine as claimed in claim 6 in which the pistons are connected to radial pins, said pins projecting from the moveable shroud parts in the direction away from the associated vane portions and being connected to sections of the moveable shroud parts remote from the pivots a distance greater than the axial length of the fixed portions of the shrouds.

References Cited in the file of this patent
UNITED STATES PATENTS 2,671,634    Morley  ---------------- Mar. 9, 1954

FOREIGN PATENTS 1,084,493    France  ---------------- July 7, 1954